(12) United States Patent
Yeung

(10) Patent No.: US 6,426,798 B1
(45) Date of Patent: Jul. 30, 2002

(54) DATA STRUCTURE FOR PRINTER DESCRIPTION FILE

(75) Inventor: Michael Lee Yeung, Mission Viejo, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/262,790

(22) Filed: Mar. 4, 1999

(51) Int. Cl.[7] .............................................. G06F 12/00
(52) U.S. Cl. ..................................... 358/1.13; 358/1.16
(58) Field of Search .............................. 358/1.13, 1.15, 358/1.16

(56) References Cited

U.S. PATENT DOCUMENTS 5,604,843 A * 2/1997 Shaw et al. ................. 395/101

OTHER PUBLICATIONS

Universal Printer Description Format Software Requirements Specification, Version 0.04, S. Matts, Printer Working Group (Nov. 12, 1998), pp. 1–8.
Charter Proposal for Universal Printer Description File Format, S. Matts, Printer Working Group (Nov. 5, 1998), pp. 1–3.
1.0 Microsoft Universal Printer Driver (Microsoft Corporation).
PostScript Printer Description File Format Specification, Version 4.3, Adobe Developer Support (Feb. 9, 1996).
Frequently Asked Questions About The Extensible Markup Language (The XML FAQ), Version 1.41 (Oct. 6, 1998).
XML Tutorials for Programmers, Ralf I. Pfeiffer, IBM XML Technology Group, (Nov. 9. 1998).
XML Enters Widespread Development, Web Development, Internet World, James C. Luh, (Jan. 4, 1999).
Specification for XML–Data, A. Layman, J. Paoli, S. De Rose and H. Thompson, (Microsoft Corporation), (Jun. 26, 1997).
The Extensible Style Language (Web Techniques, vol. 4, Issue 1, N. Walsh (Jan. 1999).

* cited by examiner

Primary Examiner—Edward Coles
Assistant Examiner—Alan Rahimi
(74) Attorney, Agent, or Firm—Fitzpatrick,Cella, Harper & Scinto

(57) ABSTRACT

A data structure for a universal printer description file, the description file for storing printer-specific description data for use in the configuration of a printer driver in a computer system that is utilizing any one of several operating systems, thereby enabling the printer driver to provide the necessary data and control interface between application programs in the computer system and the printer, regardless of the operating system being utilized by the computer system.

26 Claims, 6 Drawing Sheets

DATA STRUCTURE FOR PRINTER DESCRIPTION FILE

BACKGROUND OF THE INVENTION

1. Field of the Invention

The present invention relates to a data structure for a universal printer description file, the description file being used for configuring a printer driver in a computer system that is utilizing any one of several operating systems, thereby enabling the printer driver to provide the necessary interface between application programs in the computer system and the printer.

2. Description of the Related Art

Printers are typically interfaced to a client device, such as a computer, through a software module commonly known as a printer driver. Currently, most printer drivers are based on a monolithic model whereby the printer driver can be configured to drive multiple different printers. To drive any one particular printer, a printer description file corresponding to the printer must be provided to the driver so as to configure the driver to support the particular printer. Information relating to a particular printer, such as the capabilities, functions and commands supported by the printer, is stored within the printer description file for subsequent access and processing by the printer driver in order to configure the printer driver.

Because of compatibility issues, a different generic printer driver is required for each different operating system. Thus, the generic printer driver for a Microsoft Windows 95 operating system is different from the generic printer driver for the Apple Macintosh operating system. Likewise, a different printer description file is required for each different operating system, in correspondence with each different printer driver. For instance, Microsoft Windows NT commonly utilizes a printer description file format known as a Generic Printer Description ("GPD") file, and Apple computers commonly utilize a different printer description file format developed by Adobe Systems, Inc. known as a Postscript Printer Description ("PPD") file.

It is also common for a proprietary printer driver to be developed by a printer manufacturer in order to support that manufacturer's respective family of printers. These proprietary printer drivers are usually developed because a generic printer driver that is commonly used in a particular operating system fails to implement fully the functionality or the user interface capabilities supported by the manufacturer's printers. In correspondence to the proprietary printer driver, a proprietary printer description file is also typically required for the configuration of the proprietary printer driver to support any one particular printer. Again, for each particular printer, a different proprietary printer description file must be created to support each of the various operating systems.

Several problems are evident in these arrangements. First, a multitude of printer description files are needed to support each particular printer in the various operating systems, thereby wasting significant time and resources of system software developers and of systems managers in the creation and implementation of such printer description files. Second, the different printer description file formats necessary for supporting a particular printer in the various operating systems tend to be inconsistent regarding their implementation of the functionality and user interface capabilities of the particular printer. Third, the different formats of the printer description files require unique development tools and unique parsing tools for each respective format thereby increasing development time, complexity and cost. Fourth, printer description files currently cannot be extended to add description data related to additional printer features and capabilities without also modifying the corresponding printer driver to process these new features and capabilities. These problems result in an inconsistent presentation to the printer's users of the printer's capabilities and functionality. These problems also result in significantly increased development time and cost for systems software developers to develop and implement printer drivers and their respective printer description files.

To address these problems, the Internet Engineering Task Force (IETF) Printer Working Group (PWG) has called for the development of a so-called "Universal Printer Description File Format." Thus, the PWG has circulated a Software Requirements Specification, version 0.04, Nov. 12, 1998, that sets out functional and other requirements for a suitable file format. However, a suitable file format has not yet been proposed.

SUMMARY OF THE INVENTION

It is an object of the invention to define a data structure for a universal printer description data file ("UPDF") which can be implemented for virtually any printer and virtually any operating system, thereby enabling a printer driver to interface with the printer regardless of the operating system being utilized by the computer system. It is also an object of the present invention to provide for extensibility of the data structure so as to allow for the addition of printer description data not initially provided for in the data structure. These and other objects, features and advantages are accomplished by the present invention.

In a first aspect, the present invention provides for the definition of a universal printer data structure composed of data elements for storing description data related to a printer. A printer-specific implementation of the universal printer data structure definition is then created by populating the defined data structure with description data related to the specific printer. The printer-specific data structure is retained in a universal printer description file which is then disposed within a memory area for access and processing by a printer driver for configuring the printer driver to interface with the specific printer.

More specifically, the universal printer data structure is defined through the use of an extensible markup language which has a strict syntax for defining the printer-related data elements and their corresponding attributes including the use of start and end tags which encapsulate each data element. The extensible markup language also provides for the implementation of a strict, predetermined hierarchical data structure whereby the order and the inter-relationships of the data elements and their corresponding attributes are rigidly defined. Furthermore, the extensible markup language allows for the addition of data elements that are not provided for in the predetermined universal printer data structure definition.

A universal printer description file is created by generating a specific implementation of the universal printer data structure definition. The universal printer description file therefore requires strict compliance with the syntax of the extensible markup language and with the predetermined hierarchy of data elements and corresponding attributes defined within the universal printer data structure. The printer-specific data structure can, however, be extended beyond the universal printer data structure definition for the addition of unique data elements corresponding to characteristics and features that are unique to a specific printer.

Compliance with a predetermined data structure definition makes the universal printer description file virtually independent of any specific operating system. The present invention therefore provides for a universal printer data structure definition that can be used to create a universal printer description file for virtually any printer in virtually any operating system that supports the extensible markup language.

In the preferred form, the universal printer data structure definition is created using Extensible Markup Language ("XML") such that the data elements and their corresponding attributes are defined in a strict, hierarchical manner. Pursuant to XML, the universal printer data structure definition is retained within a file known as a Document Type Description ("DTD") file. The syntax of XML and the structural hierarchy of the data elements within the universal printer data structure definition of the DTD file must be complied with when creating a universal printer description file corresponding to a specific printer. The universal printer description file is then disposed within a memory area for access by a printer driver to enable configuration of the printer driver for supporting the printer in virtually any operating system environment that supports XML.

For example, a universal printer data structure definition is provided within a DTD file which includes a predetermined set of data elements and corresponding attributes in a predetermined fixed hierarchy to provide for the storing of printer description data such as a printer's capabilities, characteristics, features and controls. A universal printer data structure defined in the DTD is then populated with printer description data representing a particular printer in order to create a universal printer description file for that particular printer. Additional features or capabilities of the particular printer that are not provided for in the universal printer data structure definition can be accounted for by adding new data elements within the universal printer description file. The universal printer description file is disposed within a memory area and is then accessed and used to configure a printer driver in virtually any operating system to interface with the particular printer described in the universal printer description file.

By virtue of this arrangement, the present invention provides for a standardized, hierarchical universal printer description data structure definition which can be used to create a universal printer description file corresponding to a particular printer for use on virtually any operating system. The present invention therefore reduces the need for a multitude of printer description files for supporting a particular printer in multiple operating systems.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
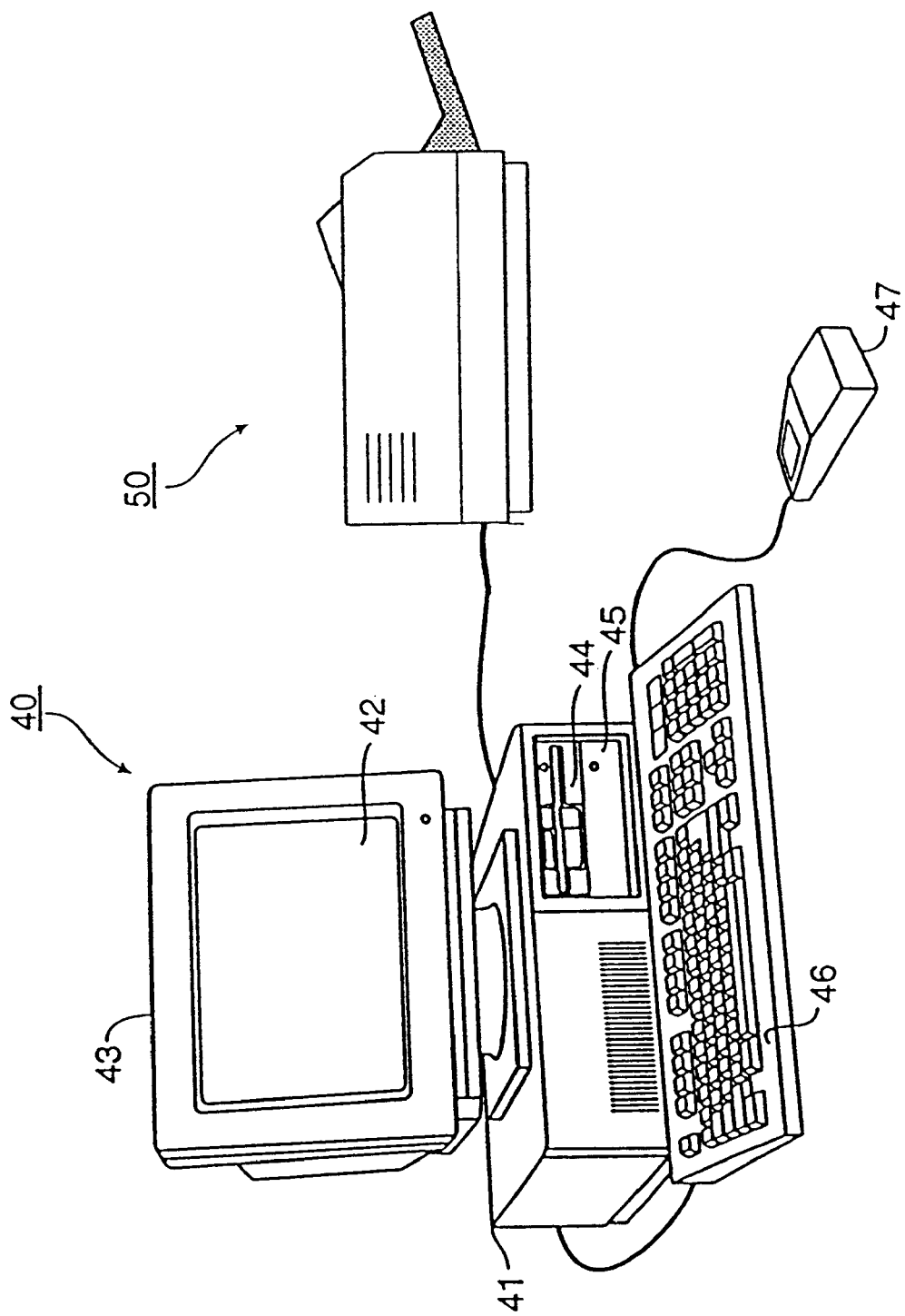
FIG. 1 is a perspective view of computing equipment and a printer used in connection with the present invention.

FIG. 1 is a view showing the outward appearance of computing equipment 40 and a printer 50 used in connection with the practice of the present invention. Computing equipment 40 includes host processor 41 which comprises a personal computer (hereinafter "PC"), preferably an IBM PC-compatible computer having a windowing environment such as Microsoft Windows 95 or Windows NT. Provided with computing equipment 40 are display 43 including display screen 42, keyboard 46 for entering text data and user commands, and pointing device 47. Pointing device 47 preferably comprises a mouse for pointing and for manipulating objects displayed on display screen 42.

Computing equipment 40 includes a computer-readable memory medium such as computer disk 45 and/or floppy disk drive 44. Floppy disk drive 44 provides a means whereby computing equipment 40 can access information, such as data, application programs, etc. stored on removable memory media. A similar CD-ROM interface (not shown) may be provided for computing equipment 40 through which computing equipment 40 can access information stored on removable CD-ROM media.

Printer 50 is a printer, such as a laser printer or an ink jet printer, which forms images on a recording medium such as paper or transparencies or the like. The invention is usable with other printers, however, so long as the printer is capable of being interfaced to computing equipment through a printer driver within said computing equipment.

Figure 2:
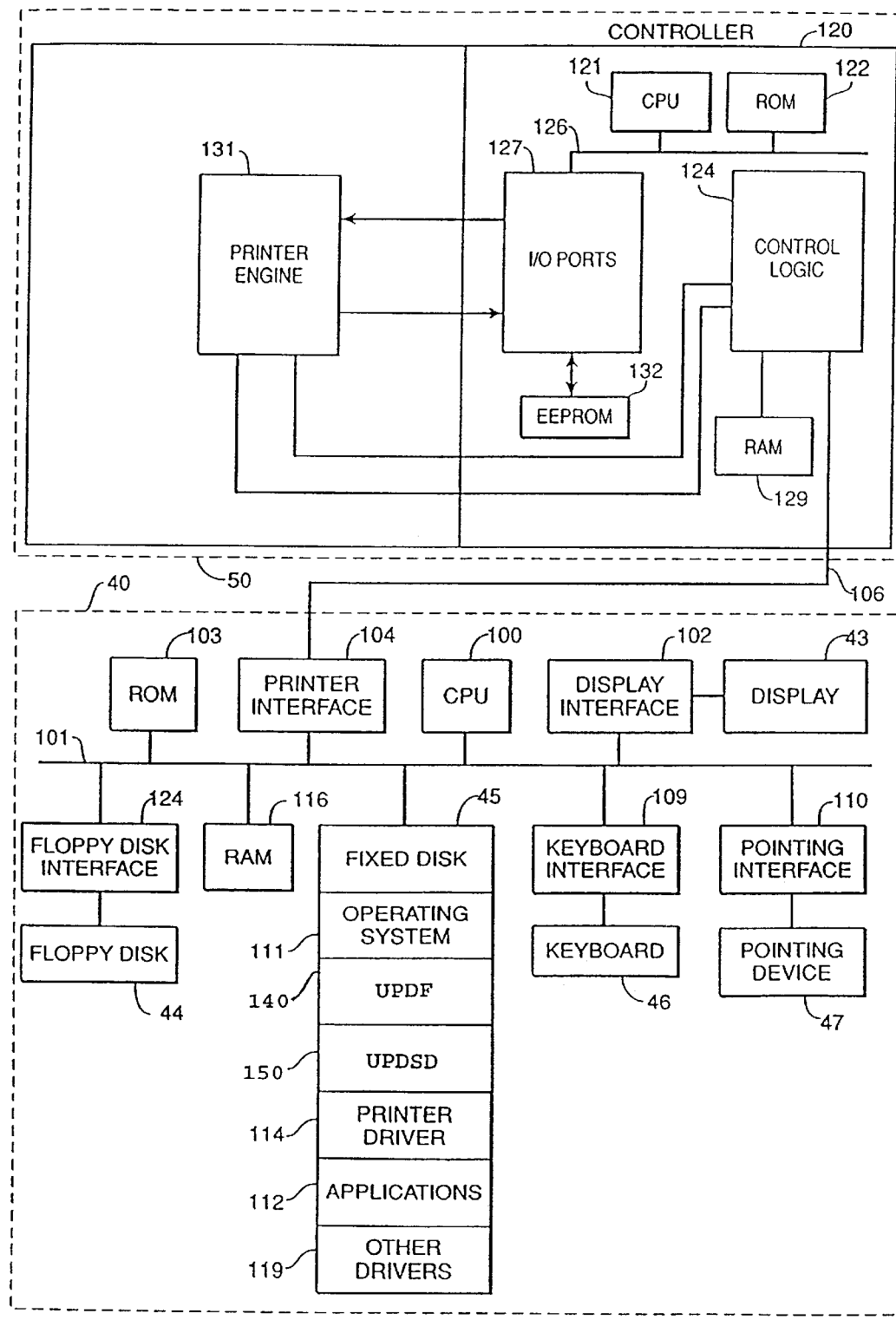
FIG. 2 is a detailed block diagram showing the hardware configuration of computing equipment interfaced to a printer.

FIG. 2 is a block diagram showing the internal structures of computing equipment 40 and printer 50. In FIG. 2, computing equipment 40 includes a central processing unit ("CPU") 100 such as a programmable microprocessor interfaced to computer bus 101. Also coupled to computer bus 101 are display interface 102 for interfacing to display 43, printer interface 104 for interfacing to printer 50 through a bi-directional communication line 106, floppy disk interface 124 for interfacing to floppy disk drive 44, keyboard interface 109 for interfacing to keyboard 46, and pointing device interface 110 for interfacing to pointing device 47. A random access memory ("RAM") 116 interfaces to computer bus 101 to provide CPU 100 with access to memory storage. In particular, when executing stored program instruction sequences, CPU 100 loads those instruction sequences from disk 45 (or other memory media such as computer readable media accessed via an unshown network interface) into RAM 116 and executes those stored program instruction sequences out of RAM 116. It should also be recognized that standard disk-swapping techniques available under windowing operating systems allow segments of memory to be swapped on and off disk 45 to RAM 116. Read only memory ("ROM") 103 in computing equipment 40 stores invariant instruction sequences, such as start-up instruction sequences or basic input/output operating system ("BIOS") sequences for operation of keyboard 46.

Disk 45 is one example of a computer readable medium that stores program instruction sequences executable by CPU 100 so as to constitute operating system 111, application programs 112, printer driver 114, universal printer data structure definition file 150, universal printer description file 140 and other application programs, files, and device drivers such as driver 119. Application programs are programs by which computing equipment 40 generates files, manipulates and stores those files on disk 45, presents data on those files to a user via display screen 42, and prints data via printer 50. Disk 45 also stores an operating system 111 which, as noted above, is preferably a windowing operating system. Device drivers are also stored on disk 45. At least one of the device drivers comprises a printer driver 114 which provides a software interface to printer 50. Data exchanged between computing equipment 40 and printer 50 is effected by printer driver 114 through program instruction sequences coded by printer driver 114. The universal printer data structure definition file 150 and the universal printer description file 140 are accessed and utilized during configuration of printer driver 114 to enable printer driver 114 to provide the proper interface to the printer 50 according to the capabilities, characteristics, features and controls of printer 50. The manner in which the universal printer data structure definition file 150 and the universal printer description file 140 are utilized to configure the printer driver 114 is described in more detail below.

Referring again to FIG. 2, printer 50 includes print controller 120 and printer engine 131. Print controller 120 contains computerized and electronic devices for interfacing with printer engine 131 to obtain print output from printer 50. As shown in FIG. 2, print controller 120 includes CPU 121 such as an 8-bit or 16-bit microprocessor, ROM 122, control logic 124 and I/O ports 127 connected to bus 126. Also connected to control logic 124 is RAM 129. Connected to I/O ports 127 is EEPROM 132 for storing printer parameters which can be obtained by computing equipment 40 over bi-directional link 106 for use during subsequent printing operations.

Printer engine 131 contains computerized, electronic and physical devices for obtaining print output from printer 50. Control logic 124 provides control signals directly to printer engine 131 and further provides control logic to printer engine 131 via I/O Ports 127. I/O Ports 127 also provide sensor output signals from printer engine 131 to control logic 124.

ROM 122 stores font data, program instruction sequences to control printer 50, and other invariant data for printer operation. RAM 129 stores print data in a print buffer defined by the program instruction sequences in ROM 122, for printout on a recordable medium (not shown) by printer engine 131. EEPROM 132 provides non-volatile reprogrammable memory for storing printer-related information which may be provided to print driver 114 in computing equipment 40 so as to inform computing equipment 40 of operational parameters of printer 50, and so as to allow print driver 114 to change print data sent to printer 50 over bi-directional communication line 106 so as to accommodate various configurations of printer 50. Preferably, the universal printer description file 140 and the universal printer data structure definition file 150 can also be stored in the ROM 122 or the EEPROM 132 of printer 50 for access by computing equipment 40 over bi-directional link 106 for configuration of the printer driver 114.

Figure 3:
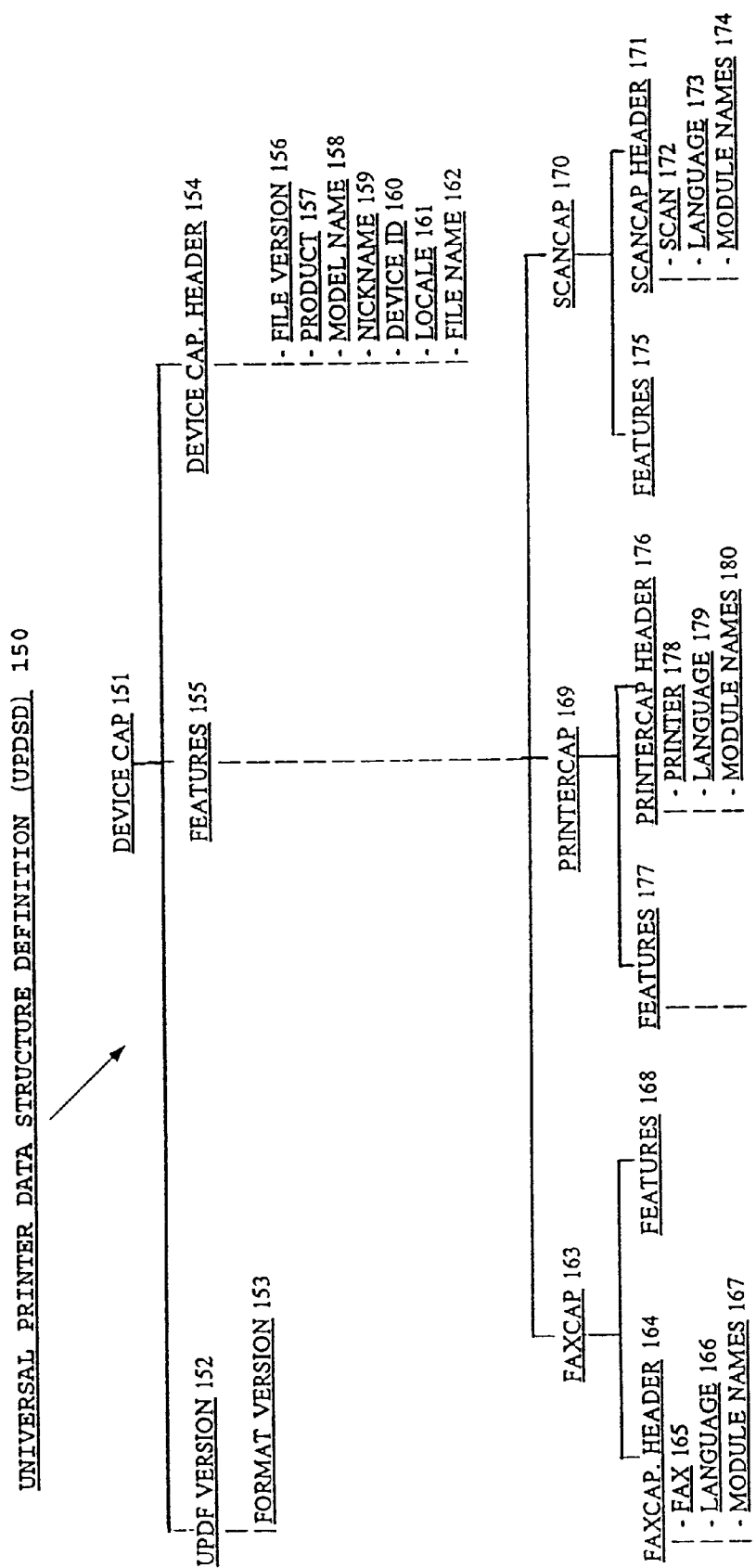
FIG. 3 is a view for explaining the universal printer data structure definition for a universal printer description file according to a first embodiment of the invention.

FIG. 3 is a view for explaining the universal printer data structure definition 150 for a universal printer description file 140 that is utilized for configuration of printer driver 114. In FIG. 3, a plurality of predetermined data elements are arranged in a predetermined logical and hierarchical structure. The predetermined plurality of data elements are for storing data related to the various capabilities, characteristics, features and controls that are typically supported by one of a plurality of printers, such as printer 50. The universal printer data structure definition 150 is created pursuant to an extensible markup language which requires compliance with a strict syntax for defining each data element, its related attributes, and its interrelationships with the other data elements in the data structure definition. The extensible markup language requires arrangement of the data elements in a rigid hierarchy but also allows for extensibility of the data structure to provide for the addition of new data elements that are not included in the predetermined plurality of data elements of the universal printer data structure definition file. The extensible markup language is also independent of virtually all operating systems such as Microsoft Windows, UNIX, and the Apple Macintosh operating system. A representative universal printer data structure definition is provided in Appendix A attached hereto and is entitled "DTD Standard for Creating UPDF in XML."

Referring again to FIG. 3, the universal printer data structure definition 150 is comprised of a device capability data element referred to as DeviceCap 151 on FIG. 3. The DeviceCap data element represents the entire functional unit of the data structure shown in FIG. 3. The DeviceCap data element 151 is located at the root of the universal printer data structure definition 150. DeviceCap data element 151 contains sub-elements which are themselves data elements. The sub-elements included in the DeviceCap data element 151 are a DeviceCap.Header data element 154, a UPDF-Version data element 152 and a Features data element 155. The DeviceCap.Header data element 154 is the device header tag for defining the header information of the particular printer device being described. The DeviceCap.Header data element 154 contains as sub-elements a FileVersion data element 156, a Product data element 157, a ModelName data element 158, a NickName data element 159, a DeviceID data element 160, a Locale data element 161 and a FileName data element 162. The FileVersion data element is reserved for future use to identify a file version for the universal printer description file. The Product data element is used to specify the product name of the printer device being described. The ModelName data element 158 is used to specify the ModelName of the printer device being described. The NickName data element 159 is used to specify a friendly name for the printer device being described. The DeviceID data element 160 is used to identify the printer device being described and itself contains sub-elements (not shown) for further identification. The Locale data element 161 is used to identify a language from any one of Japanese, English–U.S., English–U.K., French, German and Spanish. FileName data element 162 is reserved for future use.

The UPDFVersion data element 152 is used to identify the universal printer description file version and contains as a sub-element a FormatVersion data element 153 to further identify the version. The Features data element 155 is used to mark the beginning and end of the description of the complete printer device being described. Features data element 155 contains as sub-elements a FaxCap data element 163, a PrinterCap data element 169 and a ScanCap data element 170 for describing fax, printer and scan capabilities of a printer device.

FaxCap data element 163 contains a FaxCap.Header data element 164 and a Features data element 168. The FaxCap.Header data element 164 further contains a Fax data element 165, a Language data element 166 and a ModuleNames data element 167. These fax-related data elements are reserved for future use to describe fax capabilities of a printer device. Similarly, the ScanCap data element 170 contains a ScanCap.Header data element 171 and a Features data element 175. The ScanCap.Header data element 171 further contains a Scan data element 172, a Language data element 173 and a ModuleNames data element 174. These data elements are also reserved for future use to describe scan capabilities of a printer device.

The PrinterCap data element 169 represents the printer-related capabilities and functions of the printer device being described. The PrinterCap data element 169 contains as sub-elements a PrinterCap.Header data element 176 and a Features element 177. The PrinterCap.Header data element 176 represents header information of the printing unit and further contains as sub-elements a Printer data element 178, a Language data element, 179 and a ModuleNames data element 180. The Printer data element 178 is used for identification of the printer, the Language data element 179 is used to identify the PDL printer language to be used, preferably one of the group of languages consisting of LIPS4, PCL5e, PCL5C, PCL6, XL, PS2, PS3, GDIGM, ESCP, and RASTER. The ModuleNames data element 180 is reserved for future use.

Figure 4:
FIG. 4 is a further view for explaining the universal printer data structure definition of FIG. 3.

The Features data element 177, under the printer cap element 169, is used to mark the beginning and end of the complete description of the printer device printing-related features and capabilities. Referring to FIG. 4, the Features data element 177 contains as sub-elements a Physical data element 181, a Platform data element 188, a Resource data element 194, a Fonts data element 195, an Overlays data element 198, a Forms data element 199, a Communication data element 200, an OEM data element 201, a Localization data element 202 and a Global data element 203.

The Physical data element 181 identifies the hardware makeup of the printer device being described and contains as sub-elements an Engine data element 182, a RAM data element 183, a ROM data element 184, a Color data element 185, an Inserters data element 186 and a Storages data element 187. The Engine data element 182 is used to describe the type of printer engine contained in the printer device being described, such as a laser printer engine or a bubble jet printer engine. The RAM data element 183 is used to describe the amount of RAM within the printer device being described and the ROM data element 184 is used to describe the amount of ROM provided in the printer device being described. The Color data element 185 indicates whether the printing unit being described supports color printing and the manner in which color space is formed on a recordable medium. The Inserters data element 186 indicates the capability of the printing unit being described to support inserts. The Storages data element 187 indicates whether or not the printing unit being described supports storage units.

The Platform data element 188 identifies any operating system features and capabilities of the printer device being described. Platform data element 188 contains as sub-elements a ModuleNames data element 189, a HostRendering data element 190, an ObjectSignature data element 191, a DDBProc data element 192 and a CacheProc data element 193. The ModuleNames data element 189 identifies the names of object and/or binary files associated with any operating system features and capabilities. The HostRendering data element 190 indicates whether the printer device being described is capable of supporting host rendering. The ObjectSignature data element 191 indicates whether the printer device being described supports object signature. The DDBProc data element 182 indicates the callback procedure used by the printer device being described. The CacheProc data element 193 indicates the Cache procedure used by the printer device being described.

The Resource data element 194, Overlays data element 198, Forms data element 199, Communication data element 200, OEM data element 201 and Localization data element 202 are all reserved for future use to describe the printer functions and capabilities that are indicated by their respective names. The Fonts data element 195 identifies the font capabilities of the printer device unit being described. The Fonts data element 195 contains as sub-elements a data element for DefaultFont 196 and a data element for InternalFont 197. The DefaultFont data element 196 indicates whether the printing unit being described supports a default font. The InternalFont data element 197 indicates whether the printing unit being described supports internal fonts. The Internal font data element 197 contains as sub-elements (not shown) a font encoding data element, a font version data element, a font character set data element, a font status data element and a font ID data element to further identify internal fonts capabilities of the printer device.

The Global data element 203 identifies global capabilities and functions of the printer device being described and contains as sub-elements a User Interface data element 204, a Media data element 213, a PaperHandling data element 217, a Finishings data element 220, a Colors data element 231 and an ExpUnits data element 234. The User Interface data element 204 identifies the user interface capabilities and functions supported by the printer device being described and further contains as sub-elements a PrinterMemoryManage data element 205, a PageProtects data element 206, a Resolutions data element 207, a Tonersaves data element 208, a SmoothingModes data element 209, a DitherSmoothings data element 210, a Dithers data element 211 and a UIConstraints data element 212. The PrinterMemoryManage data element 205 is used for allowing the user to select from various modes of managing the memory on the printer device being described. The PageProtects data element 206 is used to indicate whether or not the printer device being described supports page protection. The Resolutions data element 206 indicates the ability of the printer device being described to support printer resolution. The TonerSaves data element 208 indicates whether or not the printer device being described supports the TonerSaves function. The SmoothingModes data element 209 indicates whether the printer device being described supports selection of smoothing modes for printing. The DitherSmoothings data element 210 indicates whether the printer device being described supports user selection of dither-smoothings for printing. The Dithers data element 211 indicates whether or not the printing unit being described supports dither capability and further includes as sub-elements a Halftones data element (not shown) and a Grayouts data element (not shown) for further describing dither functionality.

The UIconstraints data element 212 identifies user interface constraints to prevent the user from selecting a capability or function that the printer unit being described cannot support. The UIconstraints data element 212 further contains as sub-elements several data elements (not shown) to describe the maximum number of copies allowed, the maximum binding margin allowed, the face direction of the printing medium, the paint mode allowed, the printer paper names allowed, the fixing mode allowed, the registration mode allowed, the color calibration allowed and the paper layouts allowed.

The Media data element 213 identifies the recording media capabilities and functions supported by the printer device being described. The Media data element 213 further contains a Papers data element 214, a UdpInfos data element 215 and a Medias data element 216. The Papers data element 214 indicates the size and layout of the papers supported by the printer device being described and further contains as sub-elements data elements to indicate the paper area (not shown), the paper layout (not shown) and the paper finishing capability (not shown). The paper area data element contains as subelements several data elements to describe the size, area and margins of the papers supported by the printer device being described. The UdpInfos data element 215 indicates the capability of the printer device being described to support user defined paper information and further contains as sub-elements several data elements (not shown) for indicating a default size, a margin size, and a minimum and maximum size for user defined paper.

The PaperHandling data element 217 indicates the sources and destinations for paper that are supported by the printer device being described and further contains as sub-elements a PaperSources data element 218 and a PaperDestinations data element 219. The PaperSources data element 218 indicates the tray identity for the paper source and the paper that the tray can support. The PaperDestinations data element 219 indicates the destination output for the paper and the type of paper that the destination output can support. The Finishings data element 220 indicates post-printing capabilities and functions of the printer device being described and further contains as sub-elements a Duplex data element 221 for indicating duplex capability, a Booklet data element 222 for indicating booklet capability, a CenterFoldandStaple data element 223 for indicating centerfold and staple capability, a ReverseOrder data element 224 for indicating support of reverse order capability, a JobOffset data element 225 for indicating capability to offset print jobs, a CollateGroup data element 226 indicating capability to collate documents, a Mailbox data element 227 indicating support of mailbox capability, a Staple data element 228 indicating staple capability, a Folds data element 229 indicating folding capability and a HolePunch data element 230 indicating hole punch capability.

The Colors data element 231 is used to describe color functions and capabilities of the printer device being described and further contains as sub-elements a ColorProcessing data element 232 and a PixelDepths data element 233 for defining color space on the printed medium. The ColorProcessing data element 232 further contains data elements (not shown) indicating colorspace processing and color mode switch capability.

The ExpUnits data element 234 is used to identify support by the printer device of various types of expansion units for the printer device. The ExpUnits data element 234 further contains as sub-elements an ExpRAMS data element 235 for identification of expansion RAM within the printer device, an ExpFontCards data element 236 for identifying an expansion font card on the printer device being described, an ExpDuplexs data element 237 for identifying an expansion duplex unit on the printer device being described, an ExpPaperSources data element 238 for identifying an expansion paper source unit on the printer device being described, an ExpPaperDestinations data element 239 for identifying an expansion paper destination unit on the printer device being described, an ExpInserters data element 240 for identifying an expansion inserter unit on the printer device being described and an ExpStorages data element 241 for identification of an expansion storage unit on the printer device being described.

Figure 5:
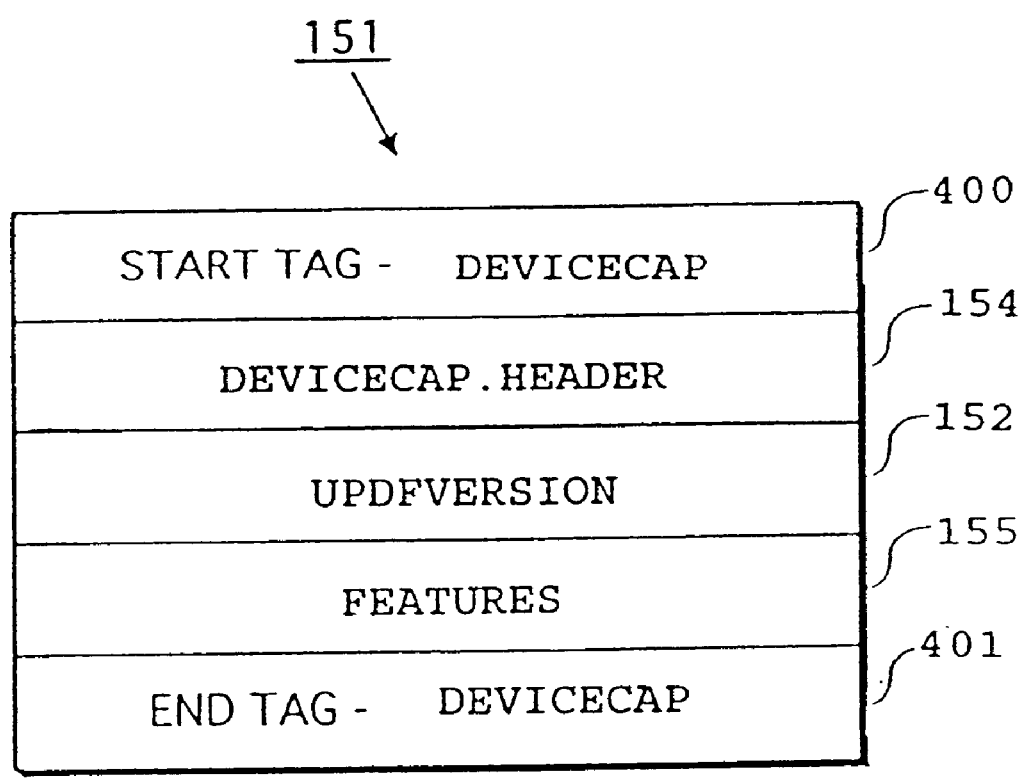
FIG. 5 is a view for explaining the format of a data element of a the universal printer description file.

FIG. 5 is a view for explaining the format of a data element of the universal printer description file 140 that is created in compliance with the universal printer data structure definition 150 of FIGS. 3 and 4. In FIG. 5, the format for the DeviceCap data element 151 is provided to identify the components of that data element. The format shown in FIG. 5 is required for compliance with the syntax of the extensible markup language that is used to define the universal printer data structure definition 150. The start tag 400 is the first component of the DeviceCap data element 151 and is used to identify the beginning of that data element. After the start tag 400, the data associated with the DeviceCap data element 151 is delineated, followed by the DeviceCap end tag 401. The data associated with a data element as defined by the extensible markup language may consist of data values, other data elements as sub-elements, or any combination of data values and/or sub-elements. Referring again to FIG. 5, the data associated with the DeviceCap data element 151 consists of three sub-elements comprising a DeviceCap.Header data element 154, a UPDFVersion data element 152 and a Features data element 155. These three sub-elements are all located at the same level of hierarchy in the universal printer data structure definition 150 and can themselves have associated data and/or sub-elements (see FIG. 3). In this manner, a nested hierarchy of data elements is established through the dependencies of the sub-elements upon their respectively superior data elements. Thus, the start tag 400 and end tag 401 encapsulate a particular hierarchy of data associated with the DeviceCap data element 151.

The universal printer data structure definition 150 is accessed and utilized to create a printer-specific data structure for placement in a universal printer data file 140. The universal printer data file 140 is created by populating the data elements defined in the universal printer data structure definition 150 with data corresponding to a specific printer, such as printer 50. The universal printer data file 140 is then placed in a memory area, such as fixed disk 45 or floppy disk 44, for access by the printer driver 114 during execution of a printer driver initialization process in CPU 100. The universal printer data file 140 can also be placed in a memory area of the printer, such as ROM 122 or EEPROM 132, for access by the printer driver 114 over bi-directional link 106 for use during execution of a printer driver initialization process in CPU 100. The printer-related data contained in the universal printer data file 140 is passed to the printer driver 114 during the initialization process to configure the printer driver for providing an interface between the applications 112 in the computer equipment 40 and the printer 50. Thus, the universal printer data file 140 can be used to configure a printer driver 114 to support printer 50 on virtually any operating system.

Figure 6:
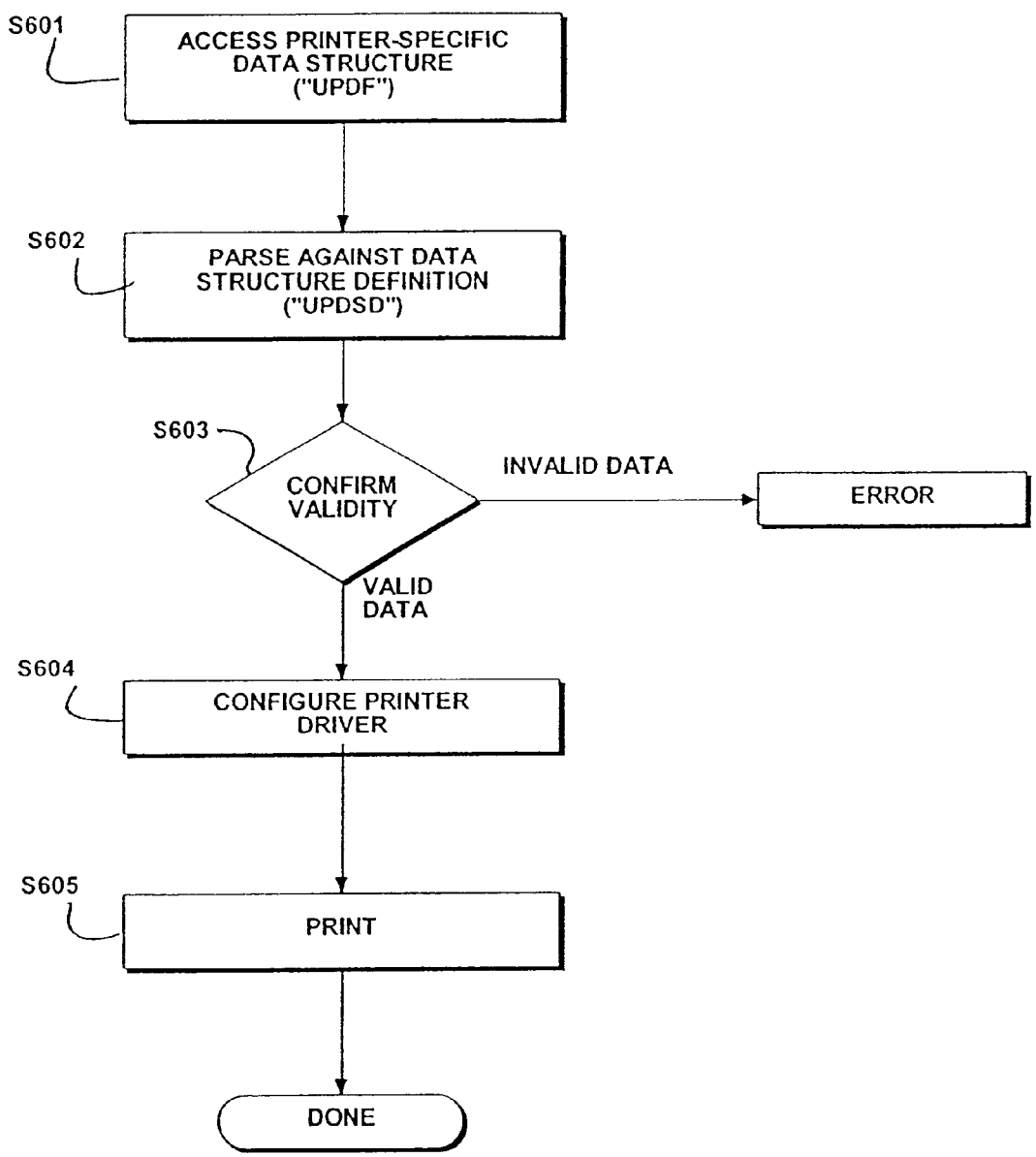
FIG. 6 is a flow diagram for explaining the use of a printer-specific data structure to configure a universal printer driver.

FIG. 6 is a flow diagram showing operation of the preferred embodiment of the invention. Briefly, according to FIG. 6, a printer-specific data structure that defines configuration and capability information for a specified printer is accessed, the printer-specific data structure is parsed against a universal data structure definition to confirm validity of the printer-specific data structure, and a printer driver is configured with the printer-specific data structure so as to enable the printer driver to print to the specified printer in the proper configuration and utilizing all of the specified printer's capabilities.

In more detail, step S601 accesses a printer-specific data structure such as the data structures described above. Access can be to UPDF 140 on disk 45 if the data structure has already been downloaded to fixed disk 45, or access can be to any one of removable media specified at the floppy disk or a CD-ROM. In situations where a printer-specific data structure has not already been stored to fixed disk 45, access can be over communication interface 106 to printer 50.

Access can be through different means as well, such as over an Internet connection or over a local or wide area network.

Step S602 parses the printer-specific data structure against the universal printer data structure definition stored at 150 on fixed disk 45. The purpose of parsing step S602 is to insure validity of the printer-specific data structure, and in addition to recognize any additional markup extensions to the data structure that are not already included in UPDSD 150. Upon confirmation of validity of the printer-specific data structure, flow advances to step S604; otherwise, an error is detected and flow terminates.

In step S604, printer driver 114 is configured in accordance with the printer-specific data structure. In accordance with this configuration step, printer driver 114, which is a universal printer driver, is configured to communicate correctly with the printer specified by the printer-specific data structure, and in addition is configured to utilize all capabilities specified by the printer-specific data structure. For example, in a case where the printer-specific data structure specifies particular finishing options that are available for a printer, the printer driver 114 is configured to access those finishing options, and in addition is configured to display a user interface that allows a user to select desired settings for such finishing operations.

Thereafter, flow advances to step S605, in which the printer driver 114 prints to printer 50.

In a preferred embodiment of the invention, the universal printer data structure definition 150 is defined pursuant to the Extensible Markup Language ("XML") and is retained in a file that is supported by XML and referred to as a Document Type Description ("DTD") file. XML is an increasingly popular markup language that is independent of any specific operating system and that provides consistency among universal printer description files through the use of strict syntax and through compliance with a rigid data structure definition provided within a DTD file. The extensibility of XML allows for the addition of data elements within a particular universal printer description file 140 that are not provided for in the predetermined set of data elements of the universal printer data structure definition 150 within the DTD. A universal printer description file 140 can therefore be created based upon the universal printer data structure definition 150 provided in the DTD file to represent virtually any one of a plurality of printers for configuration of a printer driver 114 on virtually any operating system. The DTD file is also used for error checking to confirm that the universal printer description file 140 conforms to the universal printer data structure definition 150 provided in the DTD file. Such error checking ensures that a universal printer description file complies with the data structure definition of a single DTD, thereby allowing for compatibility between a multitude of universal printer description files, printer drivers and operating systems.

The invention has been described with respect to particular illustrative embodiments. It is to be understood that the invention is not limited to the above-described embodiments and that various changes and modifications may be made by those of ordinary skill in the art without departing from the spirit and scope of the invention.

XML Universal Printer Description Format

DTD Standard for creating UPDF in XML

```
<!-- ............................................................ -->
<!-- UPDF.DTD                                             -->
<!-- 981210 ARITOMI, YEUNG                                -->
<!-- Copyright (C) 1998-1999 Canon Inc.                   -->
<!-- All rights reserved. Company confidential            -->
<!-- ............................................................ -->
<!ENTITY % rect_attributes
        'left NMTOKEN #IMPLIED
        top NMTOKEN #IMPLIED
        right NMTOKEN #IMPLIED
        bottom NMTOKEN #IMPLIED'>
<!ENTITY % point_attributes
        'x NMTOKEN #IMPLIED
        y NMTOKEN #IMPLIED'>

<!ENTITY % bool_enum
        '(FALSE|TRUE)'>
<!ENTITY % bool_attribute_false
        '%bool_enum; "FALSE"'>
<!ENTITY % bool_attribute_true
        '%bool_enum; "TRUE"'>
<!ENTITY % state3_enum
        '(DISABLE|OFF|ON)'>
<!ENTITY % state3_attribute_default
        '%state3_enum; "DISABLE"'>

<!ENTITY % locale_enum
        '(Japanese|EnglishUs|EnglishUk|French|German|Spanish)'>
<!ENTITY % locale_attribute_default
        '%locale_enum; "Japanese"'>

<!ENTITY % dmdefaultsource_enum
        '( FALSE|
        DMBIN_UPPER|
        DMBIN_ONLYONE|
        DMBIN_LOWER|
        DMBIN_MIDDLE|
        DMBIN_MANUAL|
        DMBIN_ENVELOPE|
        DMBIN_ENVMANUAL|
        DMBIN_AUTO|
        DMBIN_TRACTOR|
```

APPENDIX A

XML Universal Printer Description Format     -27-

```
            DMBIN_SMALLFMT|
            DMBIN_LARGEFMT|
            DMBIN_LARGECAPACITY|
            DMBIN_CASSETTE|
            DMBIN_FORMSOURCE|
            DMBIN_USER|
            DMBIN_CASSETTE1|
            DMBIN_CASSETTE2|
            DMBIN_CASSETTE3|
            DMBIN_CASSETTE4|
            DMBIN_CASSETTE5|
            DMBIN_CASSETTE6|
            DMBIN_CASSETTE7|
            DMBIN_CASSETTE8|
            DMBIN_CASSETTE9
         )'>
<!ENTITY % dmdefaultsource_attribute_default
         '%dmdefaultsource_enum; "FALSE"'>

<!ENTITY % dmpapersize_enum
         '( FALSE|
            DMPAPER_LETTER|
            DMPAPER_LETTERSMALL|
            DMPAPER_TABLOID|
            DMPAPER_LEDGER|
            DMPAPER_LEGAL|
            DMPAPER_STATEMENT|
            DMPAPER_EXECUTIVE|
            DMPAPER_A3|
            DMPAPER_A4|
            DMPAPER_A4SMALL|
            DMPAPER_A5|
            DMPAPER_B4|
            DMPAPER_B5|
            DMPAPER_FOLIO|
            DMPAPER_QUARTO|
            DMPAPER_10X14|
            DMPAPER_11X17|
            DMPAPER_NOTE|
            DMPAPER_ENV_9|
            DMPAPER_ENV_10|
            DMPAPER_ENV_11|
            DMPAPER_ENV_12|
            DMPAPER_ENV_14|
            DMPAPER_CSHEET|
```

-28-

XML Universal Printer Description Format

DMPAPER_DSHEET|
DMPAPER_ESHEET|
DMPAPER_ENV_DL|
DMPAPER_ENV_C5|
DMPAPER_ENV_C3|
DMPAPER_ENV_C4|
DMPAPER_ENV_C6|
DMPAPER_ENV_C65|
DMPAPER_ENV_B4|
DMPAPER_ENV_B5|
DMPAPER_ENV_B6|
DMPAPER_ENV_ITALY|
DMPAPER_ENV_MONARCH|
DMPAPER_ENV_PERSONAL|
DMPAPER_FANFOLD_US|
DMPAPER_FANFOLD_STD_GERMAN|
DMPAPER_FANFOLD_LGL_GERMAN|
DMPAPER_ISO_B4|
DMPAPER_JAPANESE_POSTCARD|
DMPAPER_9X11|
DMPAPER_10X11|
DMPAPER_15X11|
DMPAPER_ENV_INVITE|
DMPAPER_RESERVED_48|
DMPAPER_RESERVED_49|
DMPAPER_LETTER_EXTRA|
DMPAPER_LEGAL_EXTRA|
DMPAPER_TABLOID_EXTRA|
DMPAPER_A4_EXTRA|
DMPAPER_LETTER_TRANSVERSE|
DMPAPER_A4_TRANSVERSE|
DMPAPER_LETTER_EXTRA_TRANSVERSE|
DMPAPER_A_PLUS|
DMPAPER_B_PLUS|
DMPAPER_LETTER_PLUS|
DMPAPER_A4_PLUS|
DMPAPER_A5_TRANSVERSE|
DMPAPER_B5_TRANSVERSE|
DMPAPER_A3_EXTRA|
DMPAPER_A5_EXTRA|
DMPAPER_B5_EXTRA|
DMPAPER_A2|
DMPAPER_A3_TRANSVERSE|
DMPAPER_A3_EXTRA_TRANSVERSE|
DMPAPER_USER|

-29-

XML Universal Printer Description Format

```
            DMPAPER_JAPANESE_ENV_Y4|
            DMPAPER_JAPANESE_ENV_Y2|
            DMPAPER_JAPANESE_ENV_K2)'>
<!ENTITY % dmpapersize_attribute_default
        '%dmpapersize_enum; "FALSE">

<!ENTITY % dmprintquality_enum
        '( FALSE|
        DMRES_DRAFT|
        DMRES_LOW|
        DMRES_MEDIUM|
        DMRES_HIGH)'>
<!ENTITY % dmprintquality_attribute_default
        '%dmprintquality_enum; "FALSE">

<!ENTITY % colorspace_enum
        '( NONE|
        RGB|
        Gray|
        CMYK|
        CMY)'>

<!ENTITY % halftone_enum
        '( PRINTERDEFAULT|
        Resolution|
        Gradation|
        Tone|
        None|
        Solid|
        Pattern1|
        Pattern2)'>

<!ENTITY % paperdestination_enum
        '( FALSE|
        DEST_UPPER|
        DEST_ONLYONE|
        DEST_LOWER|
        DEST_MIDDLE|
        DEST_MANUAL|
        DEST_AUTO|
        DEST_LARGECAPACITY|
        DEST_CASSETTE|
        DEST_USER|
        DEST_TRAY1|
        DEST_TRAY2|
```

-30-
XML Universal Printer Description Format

```
            DEST_TRAY3|
            DEST_TRAY4|
            DEST_TRAY5|
            DEST_TRAY6|
            DEST_TRAY7|
            DEST_TRAY8|
            DEST_TRAY9|
            DEST_TRAY10|
            DEST_TRAY11|
            DEST_TRAY12
            )'>
<!ENTITY % paperdestination_attribute_default
        '%paperdestination_enum; "FALSE"'>

<!ENTITY % staplelocation_enum
        '(NONE|AUTO|1|2|LE|SE|LE2|SE2|TL|TC|TR|ML|MC|MR|BL|BC|BR|TL2|TC2|TR2|ML2|MC2|MR2|BL2|BC2|BR2)'>
<!ENTITY % staplelocation_attribute_default
        '%staplelocation_enum; "NONE"'>

<!ENTITY % physical_spec
        'Engine,RAM,ROM,Color,INSERTERS,STORAGES'>

<!ENTITY % resource_spec
        'Resource'>

<!-- ............................................................ -->
<!-- UPDF Version                                                -->
<!-- ............................................................ -->
<!ELEMENT DeviceCap (UPDFVersion,DeviceCap.Header,Features)>
<!ELEMENT UPDFVersion (FormatVersion)>
        <!ELEMENT FormatVersion (#PCDATA)>
<!ELEMENT DeviceCap.Header
(FileVersion,Product,ModelName,NickName,DeviceId,Locale,FileName)>
        <!ELEMENT FileVersion (#PCDATA)>
        <!ELEMENT Product (#PCDATA)>
        <!ELEMENT ModelName (#PCDATA)>
        <!ELEMENT NickName (#PCDATA)>
        <!ELEMENT DeviceId
(DeviceId.Mfc,DeviceId.Mdl,DeviceId.Cmd,DeviceId.Cls,DeviceId.Des,DeviceId.Cid)>
        <!ATTLIST DeviceId
                fDeviceId %bool_attribute_false;>
                <!ELEMENT DeviceId.Mfc (#PCDATA)>
                <!ELEMENT DeviceId.Mdl (#PCDATA)>
```

XML Universal Printer Description Format

```
            <!ELEMENT DeviceId.Cmd (#PCDATA)>
            <!ELEMENT DeviceId.Cls (#PCDATA)>
            <!ELEMENT DeviceId.Des (#PCDATA)>
            <!ELEMENT DeviceId.Cid (#PCDATA)>
    <!ELEMENT Locale EMPTY>
    <!ATTLIST Locale
            LocaleId %locale_attribute_default;>
    <!ELEMENT FileName (#PCDATA)>
<!ELEMENT Features (PrinterCap,FaxCap,ScanCap)>
<!-- ............................................................. -->
<!-- PRINTERCAP is TOTALSPEC STRUCTURE              -->
<!-- ............................................................. -->
<!ELEMENT PrinterCap (PrinterCap.Header,Features)>
<!ELEMENT PrinterCap.Header (Printer,Language,ModuleNames)>
    <!ELEMENT Printer (#PCDATA)>
    <!ELEMENT Language (Language.PDL,Language.IPL?,Language.JCL)>
        <!ELEMENT Language.PDL (#PCDATA)>
        <!ATTLIST Language.PDL
            PDLMajorLevel (LIPS4|PCL5e|PCL5c|PCL6XL|PS2|PS3|GDIGM) "LIPS4"
            PDLMinorLevel NMTOKEN "0">
        <!ELEMENT Language.IPL (#PCDATA)>
        <!ATTLIST Language.IPL
            IPLMajorLevel (NONE|LIPS4IMG|PCL5eIMG|GDI|GDIIM) "NONE"
            IPLMinorLevel NMTOKEN "0">
        <!ELEMENT Language.JCL (#PCDATA)>
        <!ATTLIST Language.JCL
            JCLMajorLevel (NONE|CJL|PJL|JCL|GJL) "CJL"
            JCLMinorLevel NMTOKEN "0" >
    <!ELEMENT ModuleNames(XPName,XPRSName,XPUIName,DPName,UIDPName)>
        <!ELEMENT XPName (#PCDATA)>
        <!ELEMENT XPRSName (#PCDATA)>
        <!ELEMENT XPUIName (#PCDATA)>
        <!ELEMENT DPName (#PCDATA)>
        <!ELEMENT UIDPName (#PCDATA)>
<!-- ............................................................. -->
<!-- Printer Features                               -->
<!-- ............................................................. -->
<!ELEMENT Features (Physical,Platform,%resource_spec,FONTS,Overlays,Forms,
            Communication,OEM,Localization,Global)>
<!ELEMENT Physical (%physical_spec;)>
    <!-- ............................................................. -->
    <!-- PHYSICAL PHYSICAL PHYSICAL PHYSICAL PHYSICAL PHYSICAL PHYSICAL-->
    <!-- ............................................................. -->
    <!ELEMENT Engine EMPTY >
    <!ATTLIST Engine
```

XML Universal Printer Description Format -32-

```
        EngineType (LBP|BJ) "LBP"
        EngineSpeedPPM NMTOKEN #IMPLIED>
<!ELEMENT RAM (RAM.Internal?,RAM.SlotNum?)>
<!ATTLIST RAM
        fRAM %bool_attribute_false;>
        <!ELEMENT RAM.Internal EMPTY>
        <!ATTLIST RAM.Internal
                RAMInternalSizeKb NMTOKEN "0"
                RAMInternalWorkSizeKb NMTOKEN "0">
        <!ELEMENT RAM.SlotNum (#PCDATA)>
<!ELEMENT ROM (ROM.SlotNum?,ROM.FontSlotNum?,ROM.FlashSlotNum?)>
<!ATTLIST ROM
        fROM %bool_attribute_false;>
        <!ELEMENT ROM.SlotNum (#PCDATA)>
        <!ELEMENT ROM.FontSlotNum (#PCDATA)>
        <!ELEMENT ROM.FlashSlotNum (#PCDATA)>
<!ELEMENT Color EMPTY >
<!ATTLIST Color
        tColor %state3_attribute_default;>

<!ELEMENT INSERTERS (Inserter*)>
<!ATTLIST INSERTERS
        tInserter %state3_attribute_default;
        NumInserter NMTOKEN "0" >
        <!ELEMENT Inserter (#PCDATA)>
<!ELEMENT STORAGES (Storage*)>
<!ATTLIST STORAGES
        tStorage %state3_attribute_default;
        NumStorage NMTOKEN "0" >
        <!ELEMENT Storage (#PCDATA)>
        <!ATTLIST Storage
                StorageType (NONE|Flash|HDD) "NONE"
                StorageSize NMTOKEN "0">
<!-- ............................................-->
<!-- OS/HOST  Color Management/Rendering          -->
<!-- ............................................-->
<!ELEMENT Platform (ModuleNames,HostRendering,ObjectSignature,DDBProc,CacheProc)>
        <!ELEMENT HostRendering EMPTY >
        <!ATTLIST HostRendering
                fHostRendering %bool_attribute_false; >
        <!-- ADD! HOST RENDERING DEFAULT -->

<!ELEMENT ObjectSignature EMPTY>
        <!ATTLIST ObjectSignature
                VectorSignatureWord NMTOKEN "0"
```

-33-

XML Universal Printer Description Format

```
                                RasterSignatureWord NMTOKEN "0">
        <!ELEMENT DDBProc EMPTY>
        <!ATTLIST DDBProc
                fDisableReversingDDB %bool_attribute_false;>
        <!ELEMENT CacheProc EMPTY>
        <!ATTLIST CacheProc
                fDisableObjectCache %bool_attribute_false;>

<!--ELEMENT FONTSUBS(FontSub*)-->
        <!--ATTLIST FONTSUBS
                NumFontSub NMTOKEN "0"-->
                <!--ELEMENT FontSub (#PCDATA)-->
<!-- ...............................................-->
<!-- Resource                                        -->
<!-- ...............................................-->
<!ELEMENT Resource EMPTY >
<!-- ...............................................-->
<!-- Fonts                                           -->
<!-- ...............................................-->
<!ELEMENT FONTS (DefaultFont?,InternalFont?)>
<!ATTLIST FONTS
        fFont %bool_attribute_false;>
        <!ELEMENT DefaultFont (#PCDATA)>
        <!ATTLIST DefaultFont
                DefaultFontSizePt NMTOKEN "10"
                DefaultFontDBCS CDATA #IMPLIED>
        <!ELEMENT InternalFont (Font*)>
        <!ATTLIST InternalFont
                NumInternalFont NMTOKEN #IMPLIED>
                <!ELEMENT Font (#PCDATA)>
                <!ATTLIST Font
                        FontEncording
(Standard|Special|ISOLatin1|Export|ExpertSubset|JIS|RKSJ|EUC|ShiftJIS) "Standard"
                        FontVersion CDATA #IMPLIED
                        FontCharset
(Standard|OldStandard|Special|ISOLatin1|Export|ExpertSubset|JIS83|JIS78|83_PV|ADD|EXT|NWP|JIS90|
JIS97) "Standard"
                        FontStatus (ROM|RAM|HDD) "ROM"
                        FontId NMTOKEN #IMPLIED>
<!-- ...............................................-->
<!-- Overlays                                        -->
<!-- ...............................................-->
<!ELEMENT Overlays EMPTY >
<!-- ...............................................-->
<!-- Forms                                           -->
```

XML Universal Printer Description Format

```
<!-- ............................................... -->
<!ELEMENT Forms EMPTY >
<!-- ............................................... -->
<!-- Communication                                    -->
<!-- ............................................... -->
<!ELEMENT Communication EMPTY >
<!-- ............................................... -->
<!-- OEM                                              -->
<!-- ............................................... -->
<!ELEMENT OEM EMPTY >
<!-- ............................................... -->
<!-- Localization                                     -->
<!-- ............................................... -->
<!ELEMENT Localization EMPTY >
<!-- ............................................... -->
<!-- Global                                           -->
<!-- ............................................... -->
<!ELEMENT Global (UserInterface,Media,PaperHandling,FINISHINGS,Colors,
          EXPUNITS)>
    <!-- ............................................... -->
    <!-- UserInterface                                    -->
    <!-- ............................................... -->
        <!ELEMENT UserInterface (PrinterMemoryManage,PAGEPROTECTS,RESOLUTIONS
                    TONERSAVES, SMOOTHINGMODES,DITHERSMOOTHINGS,
                                        DITHERS, UIConstraints) >
        <!ELEMENT PrinterMemoryManage (#PCDATA)>
        <!ATTLIST PrinterMemoryManage
            PrinterMemoryManageId (NONE|MaxiMem|Met|MemoryBooster) "NONE">
        <!ELEMENT PAGEPROTECTS (PageProtect*)>
        <!ATTLIST PAGEPROTECTS
            fPageProtect %bool_attribute_false;
            NumPageProtect NMTOKEN "0" >
        <!ELEMENT PageProtect (#PCDATA)>
        <!ATTLIST PageProtect
            PageProtectId (PRINTERDEFAULT|AUTO|OFF|ON|Special)
"PRINTERDEFAULT">
        <!ELEMENT RESOLUTIONS (DefaultResolution,Resolution+)>
        <!ATTLIST RESOLUTIONS
            NumResolution NMTOKEN "1">
            <!ELEMENT DefaultResolution EMPTY >
            <!ATTLIST DefaultResolution
                DefaultResolutionDPI NMTOKEN #IMPLIED
                DefaultResolutionShift NMTOKEN #IMPLIED
                DefaultResolutionUnit (dpi|inch|mm) "dpi">
            <!ELEMENT Resolution (#PCDATA)>
```

−35−
XML Universal Printer Description Format

```
<!ATTLIST Resolution
        ResoltuionDPI NMTOKEN #IMPLIED
        ResolutionDM %dmprintquality_attribute_default;>
<!ELEMENT TONERSAVES (TonerSave*)>
<!ATTLIST TONERSAVES
    fTonerSave %bool_attribute_false;
    NumTonerSave NMTOKEN "0">
    <!ELEMENT TonerSave (#PCDATA)>
    <!ATTLIST TonerSave
        TonerSaveId (PRINTERDEFAULT|ON|OFF) "PRINTERDEFAULT" >
<!ELEMENT SMOOTHINGMODES (SmoothingMode*)>
<!ATTLIST SMOOTHINGMODES
    fSmoothingMode %bool_attribute_false;
    NumSmoothingMode NMTOKEN "0">
    <!ELEMENT SmoothingMode (#PCDATA)>
    <!ATTLIST SmoothingMode
        SmoothingModeId (PRINTERDEFAULT|ON|OFF) "PRINTERDEFAULT" >

<!ELEMENT DITHERSMOOTHINGS (DitherSmoothing*)>
<!ATTLIST DITHERSMOOTHINGS
    fDitherSmoothing %bool_attribute_false;
    NumDitherSmoothing NMTOKEN "0">
    <!ELEMENT DitherSmoothing (#PCDATA)>
    <!ATTLIST DitherSmoothing
        DidtherSmoothingId (PRINTERDEFAULT|ON|OFF)
"PRINTERDEFAULT" >
<!ELEMENT DITHERS (HALFTONES, GRAYOUTS ) >
    <!-- Dithers start -->
    <!ELEMENT HALFTONES (Halftone*)>
    <!ATTLIST HALFTONES
        fHafltone %bool_attribute_false;
        NumHalftone NMTOKEN "0">
        <!ELEMENT Halftone (#PCDATA)>
        <!ATTLIST Halftone
            HalftoneId %halftone_enum; "PRINTERDEFAULT"
            ColorSpaceId %colorspace_enum; "NONE">
    <!ELEMENT GRAYOUTS (Grayout*)>
    <!ATTLIST GRAYOUTS
        fGrayout %bool_attribute_false;
        NumGrayout NMTOKEN "0">
        <!ELEMENT Grayout (#PCDATA)>
        <!ATTLIST Grayout
            GrayoutId
(PRINTERDEFAULT|Text|Graphic|TextlOff|Default|Graphic|Image|TextImage|GraphicImage|All)
"PRINTERDEFAULT" >
```

XML Universal Printer Description Format

```
<!-- Dithers end -->

<!ELEMENT UIConstraints (MaxCopies, MaxBindMarginMm, Face, PaintMode,
PrinterPaperName,
            FixingMode,HiRegistrationMode,ColorCalibration,LAYOUTS) >
<!-- VariousFuncFlag -->
<!ELEMENT MaxCopies (#PCDATA)>
<!ELEMENT MaxBindMarginMm (#PCDATA)>

<!ELEMENT Face EMPTY>
<!ATTLIST Face
        DefaultFace (PRINTERDEFAULT|FaceDown|FaceUp)
"PRINTERDEFAULT" >

<!--ELEMENT PaintMode EMPTY-->
<!--ATTLIST PaintMode
        fPaintMode %bool_attribute_false;-->
<!ELEMENT PrinterPaperName EMPTY >
<!ATTLIST PrinterPaperName
        fPrinterPaperName %bool_attribute_false; >
<!ELEMENT FixingMode EMPTY >
<!ATTLIST FixingMode
        fFixingMode %bool_attribute_false; >
<!ELEMENT HiRegistrationMode EMPTY >
<!ATTLIST HiRegistrationMode
        fHiRegistrationMode %bool_attribute_false; >
<!ELEMENT ColorCalibration EMPTY >
<!ATTLIST ColorCalibration
        fColorCalibration (FALSE|TRUE|IMG) "FALSE" >
<!ELEMENT LAYOUTS (Layout*)>
<!ATTLIST LAYOUTS
        tLayout %state3_attribute_default;
        NumLayout NMTOKEN "0">
        <!ELEMENT Layout (#PCDATA)>
        <!ATTLIST Layout
                LayoutId (NONE|Fit|Stretch|Zoom|2UP|4UP|Twice) "NONE">
<!-- ......................................... -->
<!-- Media                                     -->
<!-- ......................................... -->
<!ELEMENT Media (PAPERS,UDPINFOS,MEDIAS) >
<!ELEMENT PAPERS (DefaultPaper?,Paper+)>
<!ATTLIST PAPERS
        NumPaper NMTOKEN "1">
        <!ELEMENT DefaultPaper EMPTY>
        <!ATTLIST DefaultPaper
```

-37-
XML Universal Printer Description Format

```
                    PAPERSDefault %dmpapersize_enum; "DMPAPER_A4" >
            <!ELEMENT Paper
(PCDATA?,Paper.Area?,Paper.LayoutFlag?,Paper.FinishingFlag?)>
            <!ATTLIST Paper
                    dmpapersize %dmpapersize_attribute_default;>
            <!ELEMENT Paper.Area (
    Paper.Area.ptAreaPixel,Paper.Area.rcMarginPixel,
                                    Paper.Area.ptSizeMm10,Paper.Area.ptSizeInch100, Paper.Area.ptAreaMm10,Paper.Area.rcMarginMm10)>
                    <!ELEMENT Paper.Area.ptAreaPixel EMPTY >
                    <!ATTLIST Paper.Area.ptAreaPixel
                            %point_attributes;>
                    <!ELEMENT Paper.Area.rcMarginPixel EMPTY >
                    <!ATTLIST Paper.Area.rcMarginPixel
                            %rect_attributes;>
                    <!ELEMENT Paper.Area.ptSizeMm10 EMPTY >
                    <!ATTLIST Paper.Area.ptSizeMm10
                            %point_attributes;>
                    <!ELEMENT Paper.Area.ptSizeInch100 EMPTY >
                    <!ATTLIST Paper.Area.ptSizeInch100
                            %point_attributes;>
                    <!ELEMENT Paper.Area.ptAreaMm10 EMPTY >
                    <!ATTLIST Paper.Area.ptAreaMm10
                            %point_attributes;>
                    <!ELEMENT Paper.Area.rcMarginMm10 EMPTY >
                    <!ATTLIST Paper.Area.rcMarginMm10
                            %rect_attributes;>
            <!ELEMENT Paper.LayoutFlag EMPTY>
            <!ATTLIST Paper.LayoutFlag
                    fAssumed %bool_attribute_false;
                    fNoPairingOutputPage %bool_attribute_false;
                    fStretch %bool_enum; "TRUE"
                    f2UP %bool_enum; "TRUE"
                    f4UP %bool_enum; "TRUE"
                    fTwice %bool_enum; "TRUE" >
            <!ELEMENT Paper.FinishingFlag (FINISHINGS?)>

<!ELEMENT UDPINFOS (UDPInfo*)>
    <!ATTLIST UDPINFOS
            fUDPInfo %bool_attribute_false;
            NumUDPInfo NMTOKEN "0">
            <!ELEMENT UDPInfo
(UDPInfo.ptDefSizeMm10,UDPInfo.rcMarginMm10,UDPInfo.ptMinSizeMm10,UDPInfo.ptMaxSizeMm
10)>
```

XML Universal Printer Description Format

```
            <!ELEMENT UDPInfo.ptDefSizeMm10 EMPTY >
            <!ATTLIST UDPInfo.ptDefSizeMm10
                    %point_attributes;>
            <!ELEMENT UDPInfo.rcMarginMm10 EMPTY >
            <!ATTLIST UDPInfo.rcMarginMm10
                    %rect_attributes;>
            <!ELEMENT UDPInfo.ptMinSizeMm10 EMPTY >
            <!ATTLIST UDPInfo.ptMinSizeMm10
                    %point_attributes;>
            <!ELEMENT UDPInfo.ptMaxSizeMm10 EMPTY >
            <!ATTLIST UDPInfo.ptMaxSizeMm10
                    %point_attributes;>
    <!ELEMENT MEDIAS (Media*)>
    <!ATTLIST MEDIAS
            fMedia %bool_attribute_false;
            NumMedia NMTOKEN "0">
            <!ELEMENT Media (#PCDATA)>
            <!ATTLIST Media
                    MediaId
(PRINTERDEFAULT|PrePrinted|Plane|Thickness|Transparency|Coated) "PRINTERDEFAULT" >
    <!-- ......................................................-->
    <!-- PaperHandling                              -->
    <!-- ......................................................-->
            <!ELEMENT PaperHandling (PAPERSOURCES,PAPERDESTINATIONS)>
    <!-- -->
            <!ELEMENT PAPERSOURCES (DefaultPaperSource?,PaperSource*)>
            <!ATTLIST PAPERSOURCES
                    NumPaperSource NMTOKEN "0">
                    <!ELEMENT DefaultPaperSource EMPTY>
                    <!ATTLIST DefaultPaperSource
                            PAPERSOURCESDefault %dmdefaultsource_enum; "DMBIN_AUTO" >
                    <!ELEMENT PaperSource (PCDATA,PAPERS)>
                    <!ATTLIST PaperSource
                            dmdefaultsource %dmdefaultsource_attribute_default;
                            Invocation CDATA #IMPLIED>
            <!ELEMENT PAPERDESTINATIONS (DefaultPaperDestination?,PaperDestination*)>
            <!ATTLIST PAPERDESTINATIONS
                    NumPaperDestination NMTOKEN "0">
                    <!ELEMENT DefaultPaperDestination EMPTY>
                    <!ATTLIST DefaultPaperDestination
                            PAPERDESTINATIONDefault %paperdestination_enum; "FALSE">
                    <!ELEMENT PaperDestination (PCDATA,PAPERS)>
                    <!ATTLIST PaperDestination
                            paperdestination %paperdestination_attribute_default;
                            Invocation CDATA #IMPLIED>
```

XML Universal Printer Description Format

```
<!-- ......................................................... -->
<!-- Finishing                                     -->
<!-- ......................................................... -->
<!ELEMENT FINISHINGS
(Duplex?,Booklet?,CenterFoldAndStaple?,ReverseOrder?,JobOffset?,Collate,Group?,MailBox?,Staple?,FOLDS?,HolePunch?)>
        <!ATTLIST FINISHINGS
                tFinishings %state3_attribute_default;>
        <!ELEMENT Duplex EMPTY>
        <!ATTLIST Duplex
                tDuplex %state3_attribute_default;>
        <!ELEMENT Booklet EMPTY>
        <!ATTLIST Booklet
                tBooklet %state3_attribute_default;>
                <!--ELEMENT Booklet.MaxNum (#PCDATA)-->
                <!--ELEMENT Booklet.MaxBindMarginMm (#PCDATA)-->
        <!-- ELEMENT CenterFoldAndStaple EMPTY -->
        <!-- ATTLIST CenterFoldAndStaple
                tCenterFoldAndStaple %state3_attribute_default;-->
        <!ELEMENT ReverseOrder EMPTY >
        <!ATTLIST ReverseOrder
                tReverseOrder %state3_attribute_default;>
        <!ELEMENT JobOffset EMPTY>
        <!ATTLIST JobOffset
                tJobOffset %state3_attribute_default;>
        <!ELEMENT JobRotation EMPTY>
        <!ATTLIST JobRotation
                tJobRotation %state3_attribute_default;>
        <!ELEMENT Collate (CollateType?)>
        <!ATTLIST Collate
                tCollate %state3_attribute_default;>
                <!ELEMENT CollateType EMPTY>
                <!ATTLIST CollateType
                        CollateTypeId (AUTO|SIHardware) "AUTO">
                <!--ELEMENT Collate.MaxNum (#PCDATA)-->
        <!ELEMENT Group EMPTY>
        <!ATTLIST Group
                tGroup %state3_attribute_default;>
        <!ELEMENT MailBox (MailBox.MaxNum?)>
        <!ATTLIST MailBox
                tMailBox %state3_attribute_default;>
                <!ELEMENT MainlBox.MaxNum (#PCDATA)>
        <!ELEMENT Staple (Staple.MaxNum?,Staple.LOCATIONS?)>
        <!ATTLIST Staple
```

−40−

XML Universal Printer Description Format

```
                    tStaple %state3_attribute_default;>
                    <!ELEMENT Staple.MaxNum (#PCDATA)>
                    <!ELEMENT Staple.LOCATIONS (Staple.Location*)>
                    <!ATTLIST Staple.LOCATIONS
                            Staple.NumLocation NMTOKEN "0">
                            <!ELEMENT Staple.Location (#PCDATA)>
                            <!ATTLIST Staple.Location
                                    Staple.LocationId %staplelocation_attribute_default;>
            <!ELEMENT FOLDS (Fold*)>
            <!ATTLIST FOLDS
                    tFold %state3_attribute_default;
                    NumFold NMTOKEN "0">
                    <!-- ELEMENT Fold.MaxNum (#PCDATA) -->
                    <!ELEMENT Fold (Fold.Type)>
                            <!ELEMENT Fold.Type EMPTY>
                            <!ATTLIST Fold.Type
                                    FoldTypeId
(NONE|ZFold|Saddle|DoubleGate|LeftGate|RightGate|LetterFold|XFold) "NONE"
                                    MaxNum     NMTOKEN #IMPLIED>
            <!ELEMENT HolePunch (HolePunch.MaxNum?)>
            <!ATTLIST HolePunch
                    tHolePunch %state3_attribute_default;>
                    <!ELEMENT HolePunch.MaxNum (#PCDATA)>

<!-- ........................................................-->
    <!-- Colors                                                -->
    <!-- ........................................................-->
            <!ELEMENT Colors (ColorProcessing,PIXELDEPTHS) >
            <!ELEMENT ColorProcessing (COLORSPACES,ColorModeSwith?)>
                    <!ELEMENT COLORSPACES (ColorSpace*,BaseColorSpace?)>
                    <!ATTLIST COLORSPACES
                            fColorSpace %bool_attribute_false;
                            NumColorSpace NMTOKEN "0">
                            <!ELEMENT ColorSpace EMPTY >
                            <!ATTLIST ColorSpace
                                    ColorSpaceId %colorspace_enum; "Gray">
                            <!ELEMENT BaseColorSpace EMPTY>
                            <!ATTLIST BaseColorSpace
                                    BaseColorSpaceId (NONE|NTSC|sRGB) "NTSC">
                    <!ELEMENT ColorModeSwith EMPTY >
                    <!ATTLIST ColorModeSwith
                            ColorModeSwitchId (NONE|AUTO|Job|Page) "NONE">

<!ELEMENT PIXELDEPTHS (PixelDepth*)>
    <!ATTLIST PIXELDEPTHS
```

-41-

XML Universal Printer Description Format

```
                fPixelDepth %bool_attribute_false;
                NumPixelDepth NMTOKEN "0">
        <!ELEMENT PixelDepth (#PCDATA)>
        <!ATTLIST PixelDepth
                PixelDepthId NMTOKEN #IMPLIED
                ColorSpaceId %colorspace_enum; "NONE">
<!-- ........................................................-->
        <!-- Expansion Units                        -->
<!-- ........................................................-->
        <!ELEMENT
EXPUNITS(EXPRAMS,EXPFONTCARDS,EXPDUPLEXS,EXPPAPERSOURCES,EXPPAPERDESTI
NATIONS,EXPINSERTERS,EXPSTORAGES)>
        <!ELEMENT EXPRAMS (ExpRAM*)>
        <!ATTLIST EXPRAMS
                fExpRAM %bool_attribute_false;
                NumExpRAM NMTOKEN "0">
        <!ELEMENT ExpRAM (#PCDATA)>
        <!ATTLIST ExpRAM
                EntryNumber NMTOKEN "0"
                ExpRAMSizeMB NMTOKEN #IMPLIED>

<!ELEMENT EXPFONTCARDS (ExpFontCard*)>
        <!ATTLIST EXPFONTCARDS
                fExpFontCard %bool_attribute_false;
                NumExpFontCard NMTOKEN "0">
        <!ELEMENT ExpFontCard (PCDATA,ExpFontCard.FONTS)>
        <!ATTLIST ExpFontCard
                ExpFontCardId NMTOKEN #IMPLIED>
                <!ELEMENT ExpFontCard.FONTS (Font*)>
                <!ATTLIST ExpFontCard.FONTS
                        ExpFontNum NMTOKEN #IMPLIED>
                    <!-- ELEMENT Font (#PCDATA)-->

<!ELEMENT EXPDUPLEXS (ExpDuplex*)>
        <!ATTLIST EXPDUPLEXS
                fExpDuplex %bool_attribute_false;
                NumExpDuplex NMTOKEN "0">
        <!ELEMENT ExpDuplex (PCDATA,PAPERS)>
                <!-- ????? FINISHINGS -->
                <!-- ELEMENT PAPERS (Paper)+-->

<!ELEMENT EXPPAPERSOURCES (ExpPaperSource*)>
        <!ATTLIST EXPPAPERSOURCES
                fExpPaperSource %bool_attribute_false;
                NumExpPaperSource NMTOKEN "0">
```

XML Universal Printer Description Format

```
<!ELEMENT ExpPaperSource (PCDATA,PAPERSOURCES)>
    <!-- ELEMENT PaperSource -->

<!ELEMENT EXPPAPERDESTINATIONS (ExpPaperDestination*)>
<!ATTLIST EXPPAPERDESTINATIONS
    fExpPaperDestination %bool_attribute_false;
    NumExpPaperDestination NMTOKEN "0">
    <!ELEMENT ExpPaperDestination
(PCDATA,FINISHINGS?,PAPERDESTINATIONS)>
    <!-- ELEMENT FINISHINGS -->
    <!-- ELEMENT PaperDestination -->

<!ELEMENT EXPINSERTERS (Inserter*)>
<!ATTLIST EXPINSERTERS
    fExpInserter %bool_attribute_false;
    NumExpInserter NMTOKEN "0">
    <!--ELEMENT Inserter (#PCDATA)-->
<!ELEMENT EXPSTORAGES (Storage*)>
<!ATTLIST EXPSTORAGES
    fExpStorage %bool_attribute_false;
    NumExpStorage NMTOKEN "0">
    <!--ELEMENT Storage (#PCDATA)-->

<!-- ............................................... -->
<!-- FAXCAP is TOTALSPEC STRUCTURE for Fax            -->
<!-- ............................................... -->
<!ELEMENT FaxCap (FaxCap.Header,Features)>
<!ELEMENT FaxCap.Header (Fax,Language,ModuleNames)>
    <!ELEMENT Fax (#PCDATA)>
<!-- ............................................... -->
<!-- Fax Features                                     -->
<!-- ............................................... -->

<!-- ............................................... -->
<!-- SCANCAP is TOTALSPEC STRUCTURE for Scan          -->
<!-- ............................................... -->
<!ELEMENT ScanCap (ScanCap.Header,Features)>
<!ELEMENT ScanCap.Header (Scan,Language,ModuleNames)>
    <!ELEMENT Scan (#PCDATA)>
<!-- ............................................... -->
<!-- Scan Features                                    -->
<!-- ............................................... -->
```

-42-

What is claimed is:

1. A memory for access by a printer driver software module within a computer system, said printer driver software module for providing a data interface between application software modules within said computer system and at least one of a plurality of different printers, said memory comprising:

a data structure stored in said memory, said data structure including a plurality of data elements for storing printer-specific information relating to one of a plurality of different printers, including a plurality of predetermined data elements for storing information relating to an identification of a printer, a printer language to be used for said printer, the physical features and hardware makeup of said printer, including type of printer engine and printer memory of said printer, and relating to capabilities of said printer for supporting fonts, user interfaces and recording media, each said data element comprising a start tag, an end tag and data disposed between said start tag and said end tag, said data elements being arranged in a predetermined fixed hierarchy and being specified in compliance with an extensible markup language, and said data structure being extensible for the inclusion of additional printer-specific data elements.

2. A memory according to claim 1, wherein said predetermined plurality of data elements contained in said data structure further includes data elements for storing information related to capabilities of said printer for supporting recording media handling, finishing and expansion units.

3. A method for configuring a printer driver software module within a computer system having a memory area, said printer driver software module for providing a data interface between application software modules within said computer system and at least one of a plurality of printers, said method comprising the steps of:

accessing a universal printer data structure definition that supports a plurality of operating systems, said universal printer data structure containing a plurality of data elements for storing printer-specific information relating to one of a plurality of different printers, including a predetermined plurality of data elements for storing information related to an identification of a printer, a printer language to be used for said printer, identification of physical features and hardware makeup of said printer, including type of printer engine and printer memory of said printer, and capabilities of said printer for supporting fonts, user interfaces and recording media, each said data element comprising a start tag, an end tag and data disposed between said start tag and said end tag, said data elements being arranged in a predetermined fixed hierarchy and being specified in compliance with an extensible markup language, and said universal printer data structure being extensible for the inclusion of additional printer-specific data elements;

creating a printer-specific data structure that supports a plurality of operating systems by storing information related to a printer within said data elements of said universal printer data structure definition;

storing said printer-specific data structure within said memory area for processing by said printer driver software module; and executing an initialization process for said printer driver software module, said initialization process including the processing of said printer-specific data structure whereby said data elements are passed to said printer driver software module to configure said printer driver software module for providing a data interface between said application software modules and said printer.

4. A method according to claim 3, wherein said predetermined plurality of data elements contained in said universal printer data structure further includes data elements for storing information related to capabilities of said printer for supporting recording media handling, finishing and expansion units.

5. A method according to claim 3, wherein said memory area for storing of said printer-specific data structure is a removable memory media.

6. A method according to claim 3, wherein said memory area for storing of said printer-specific data structure is a memory area within said printer.

7. A method according to claim 3, wherein said memory area for storing of said printer-specific data structure is a remote memory area accessible to said printer driver software module by a network connection to said computer system.

8. A method according to claim 3, further comprising a parsing step for parsing said printer-specific data structure against said universal printer data structure definition to confirm conformity of said printer-specific data structure with said universal printer data structure definition.

9. Computer-executable process steps stored on a computer-readable medium, the computer-executable process steps to configure a printer driver software module within a computer system having a memory area, said printer driver software module for providing a data interface between application software modules within said computer system and at least one of a plurality of printers, said computer-executable process steps comprising:

code to access a universal printer data structure definition that supports a plurality of operating systems, said universal printer data structure containing a plurality of data elements for storing printer-specific information relating to one of a plurality of different printers, including a predetermined plurality of data elements for storing information related to an identification of a printer, a printer language to be used for said printer, identification of physical features and hardware makeup of said printer, including type of printer engine and printer memory of said printer, and capabilities of said printer for supporting fonts, user interfaces and recording media, each said data element comprising a start tag, an end tag and data disposed between said start tag and said end tag, said data elements being arranged in a predetermined fixed hierarchy and being specified in compliance with an extensible markup language, and said universal printer data structure being extensible for the inclusion of additional printer-specific data elements addition of printer-specific data elements;

code to create a printer-specific data structure that supports a plurality of operating systems by storing information related to a printer within said data elements of said universal printer data structure definition;

code to store said printer-specific data structure within said memory area for processing by said printer driver software module; and code to execute an initialization process for said printer driver software module, said initialization process including the processing of said printer-specific data structure whereby said data elements are passed to said printer driver software module to configure said printer driver software module for providing a data interface between said application software modules and said printer.

10. Computer-executable process steps according to claim 9, wherein said predetermined plurality of data elements contained in said universal printer data structure further includes data elements for storing information related to capabilities of said printer for supporting recording media handling, finishing and expansion units.

11. Computer-executable process steps according to claim 9, wherein said memory area for storing of said printer-specific data structure is a removable memory media.

12. Computer-executable process steps according to claim 9, wherein said memory area for storing of said printer-specific data structure is a memory area within said printer.

13. Computer-executable process steps according to claim 9, wherein said memory area for storing of said printer-specific data structure is a remote memory area accessible to said printer driver software module by a network connection to said computer system.

14. Computer-executable process steps according to claim 9, further comprising code to parse said printer-specific data structure against said universal printer data structure definition to confirm conformity of said printer-specific data structure with said universal printer data structure definition.

15. A computer-readable medium which stores computer-executable process steps, the computer-executable process steps to configure a printer driver software module within a computer system having a memory area, said printer driver software module for providing a data interface between application software modules within said computer system and at least one of a plurality of printers, said computer-executable process steps comprising:

an accessing step to access a universal printer data structure definition that supports a plurality of operating systems, said universal printer data structure containing a plurality of data elements for storing printer-specific information relating to one of a plurality of different printers, including a predetermined plurality of data elements for storing information related to an identification of a printer, a printer language to be used for said printer, identification of physical features and hardware makeup of said printer, including type of printer engine and printer memory of said printer, and capabilities of said printer for supporting fonts, user interfaces and recording media, each said data element comprising a start tag, an end tag and data disposed between said start tag and said end tag, said data elements being arranged in a predetermined fixed hierarchy and being specified in compliance with an extensible markup language, and said universal printer data structure being extensible for the inclusion of additional printer-specific data elements;

a creating step to create a printer-specific data structure that supports a plurality of operating systems by storing information related to a printer within said data elements of said universal printer data structure definition;

a storing step to store said printer-specific data structure within said memory area for processing by said printer driver software module; and an executing step to execute an initialization process for said printer driver software module, said initialization process including the processing of said printer-specific data structure whereby said data elements are passed to said printer driver software module to configure said printer driver software module for providing a data interface between said application software modules and said printer.

16. A computer-readable medium according to claim 15, wherein said predetermined plurality of data elements contained in said universal printer data structure further includes data elements for storing information related to capabilities of said printer for supporting recording media handling, finishing and expansion units.

17. A computer-readable medium according to claim 15, wherein said memory area for storing of said printer-specific data structure is a removable memory media.

18. A computer-readable medium according to claim 15, wherein said memory area for storing of said printer-specific data structure is a memory area within said printer.

19. A computer-readable medium according to claim 15, wherein said memory area for storing of said printer-specific data structure is a remote memory area accessible to said printer driver software module by a network connection to said computer system.

20. A computer-readable medium according to claim 15, further comprising a parsing step for parsing said printer-specific data structure against said universal printer data structure definition to confirm conformity of said printer-specific data structure with said universal printer data structure definition.

21. A computer device for configuring a printer driver software module within said computer device, said printer driver software module for providing a data interface between application software modules within said computer device and a printer connected to said computer device, computer device comprising a memory area; and a processor that (i) accesses a universal printer data structure definition that supports a plurality of operating systems, said universal printer data structure containing a plurality of data elements for storing printer-specific information relating to one of a plurality of different printers, including a predetermined plurality of data elements for storing information related to an identification of a printer, a printer language to be used for said printer, identification of physical features and hardware makeup of said printer, including type of printer engine and printer memory of said printer, and capabilities of said printer for supporting fonts, user interfaces and recording media, each said data element comprising a start tag, an end tag and data disposed between said start tag and said end tag, said data elements being arranged in a predetermined fixed hierarchy and being specified in compliance with an extensible markup language, and said universal printer data structure being extensible for the inclusion of additional printer-specific data elements, (ii) creates a printer-specific data structure that supports a plurality of operating systems by storing information related to a printer within said data elements of said universal printer data structure definition, (iii) stores said printer-specific data structure within said memory area for processing by said printer driver software module, and (iv) executes an initialization process for said printer driver software module, said initialization process including the processing of said printer-specific data structure whereby said data elements are passed to said printer driver software module to configure said printer driver software module for providing a data interface between said application software modules and said printer.

22. A computer device according to claim 21, wherein said predetermined plurality of data elements contained in said universal printer data structure further includes data elements for storing information related to capabilities of said printer for supporting recording media handling, finishing and expansion units.

23. A computer device according to claim 21, wherein said memory area for storing of said printer-specific data structure is a removable memory media.

24. A computer device according to claim 21, wherein said memory area for storing of said printer-specific data structure is a memory area within said printer.

25. A computer device according to claim 21, wherein said memory area for storing of said printer-specific data structure is a remote memory area accessable to said printer driver software module by a network connection to said computer system.

26. A computer device according to claim 21, wherein said processor parses said printer-specific data structure against said universal printer data structure definition to confirm conformity of said printer-specific data structure with said universal printer data structure definition.

* * * * *

UNITED STATES PATENT AND TRADEMARK OFFICE
CERTIFICATE OF CORRECTION

PATENT NO.   : 6,426,798 B1
DATED        : July 30, 2002
INVENTOR(S)  : Michael Lee Yeung It is certified that error appears in the above-identified patent and that said Letters Patent is hereby corrected as shown below:

Column 4,
Line 2, "of a the" should read -- of the --.

Column 9,
Line 6, "subelements" should read -- sub-elements --.

Column 50,
Line 28, "device," should read -- device, said --; and
Line 29, "comprising" should read -- comprising: --.

Signed and Sealed this

Eighteenth Day of March, 2003

JAMES E. ROGAN
*Director of the United States Patent and Trademark Office*